W. P. MORROW.
CULTIVATOR.
APPLICATION FILED MAY 10, 1912.
1,053,630.
Patented Feb. 18, 1913.
2 SHEETS—SHEET 1.
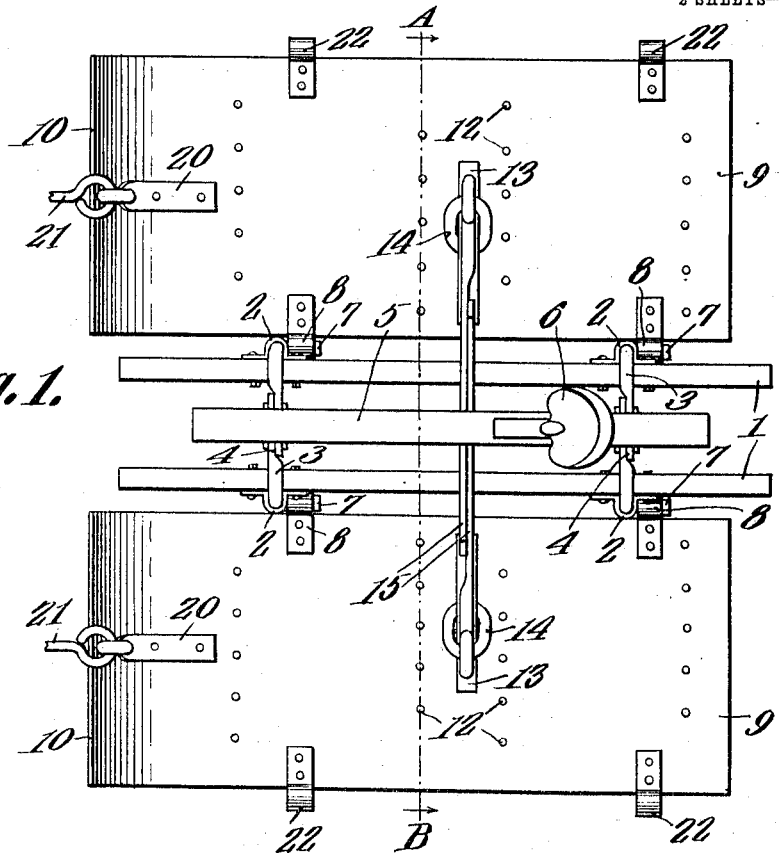
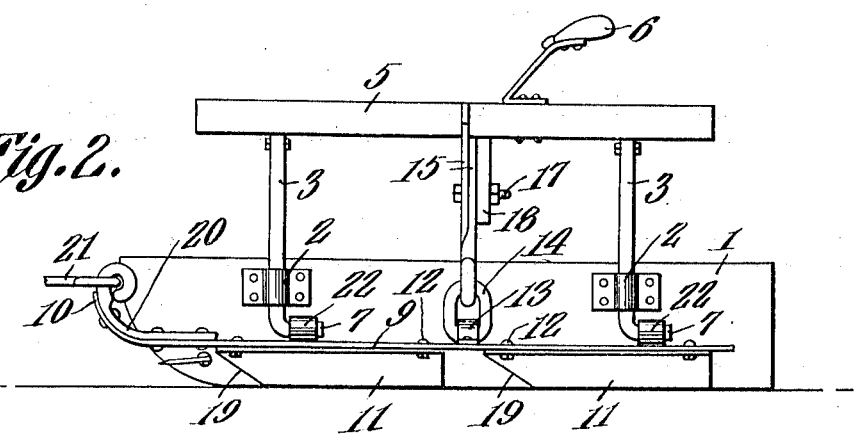
William P. Morrow,
Inventor
Witnesses
by C. A. Snow & Co.
Attorneys

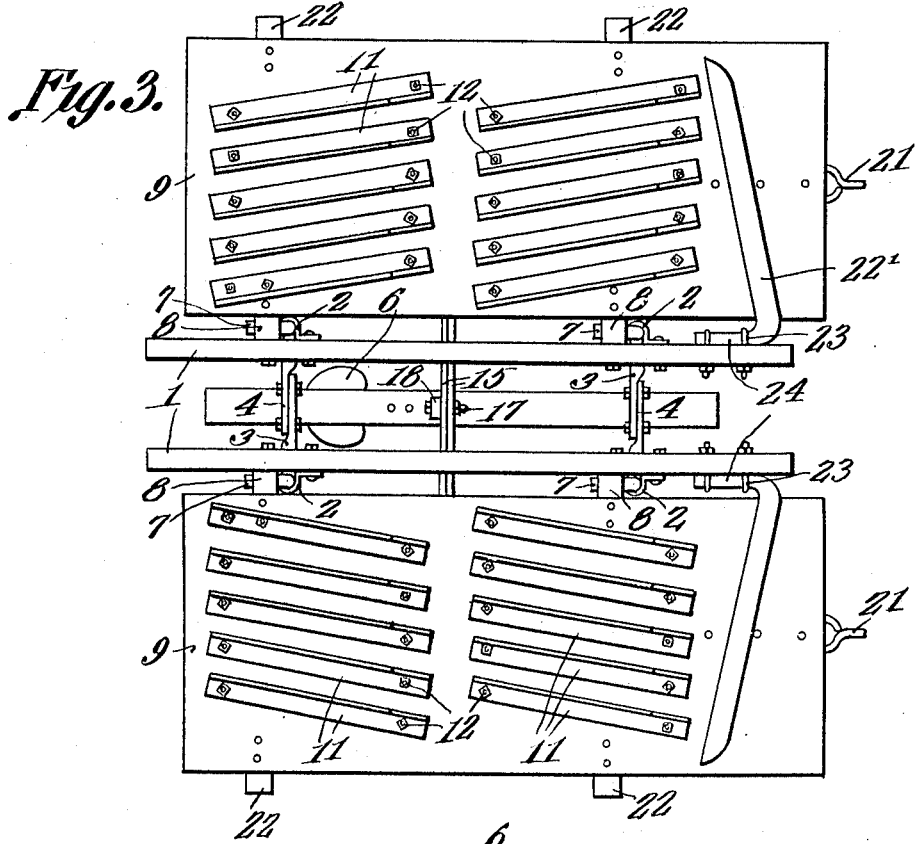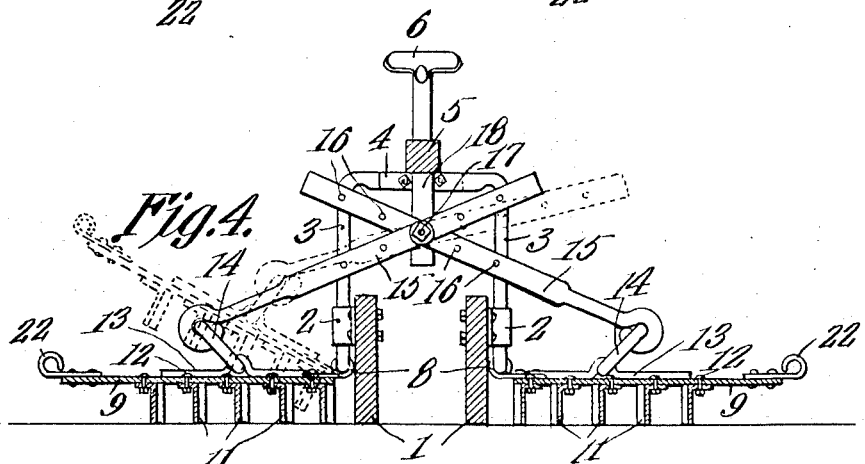

UNITED STATES PATENT OFFICE.

WILLIAM P. MORROW, OF WOODWARD, OKLAHOMA.

CULTIVATOR.

1,053,630.  Specification of Letters Patent.  Patented Feb. 18, 1913.

Application filed May 10, 1912. Serial No. 696,510.

*To all whom it may concern:*

Be it known that I, WILLIAM P. MORROW, a citizen of the United States, residing at Woodward, in the county of Woodward and State of Oklahoma, have invented a new and useful Cultivator, of which the following is a specification.

This invention relates to cultivators particularly designed for use in cultivating listed corn or corn planted in furrows or ditches.

One of the objects of the present invention is to provide a cultivator of this type having supporting runners or the like designed to travel in the furrow, there being means adjustably connected to the sides of said runners for directing the loosened soil either into or away from the furrow.

A further object is to provide a machine of this character which can be used in the cultivation of various kinds of growing crops and which can also be used for pulverizing, leveling and packing the soil, there being means combined with the machine for cutting off grass and weeds.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of the machine. Fig. 2 is a side elevation thereof. Fig. 3 is a bottom plan view. Fig. 4 is a section on line A—B Fig. 1.

Referring to the figures by characters of reference 1 designates parallel runners having front and rear brackets 2 on the outer faces thereof within which are slidably mounted the downwardly extending side portions of arches 3. These arches are supported perpendicularly to the runners and each arch is preferably formed of two sections having their upper ends lapped and bolted together, as shown at 4. A beam 5 is supported by the arches and a seat 6 for the driver is mounted thereon.

The lower ends of the arches 3 are bent rearwardly, as shown at 7, so as to project through eyes 8 upstanding from the inner sides of cultivator sections 9. Each of these sections is preferably made up of a substantially oblong body having flat upper and lower faces, the front end of the body being upturned, as shown at 10, so as to ride easily over the soil contacted thereby. Series of soil engaging blades 11 are secured to the lower face of each body portion 9, the blades of each series being preferably formed of angle strips parallel to each other and arranged diagonally upon the lower face of the body portion, as shown particularly in Fig. 3. Preferably two of these series are employed although it is to be understood that any desired number of them may be used. The blades of both series on the body are disposed along parallel lines and each blade is detachably connected to the body portion 9 by means of bolts 12 or the like. A bracket 13 is secured upon the middle portion of each of the body portions 9, and is connected, by means of a link 14, to one end of a brace bar 15. The bars 15 of the two sections are crossed and each of them has a series of apertures 16 therein any one of which is adapted to receive a threaded bolt 17 extending from a bracket 18 depending from beam 5. Thus it will be seen that the bars 15 can be securely held relative to the beam 5 and the sections 9 held in proper positions relative to the runners.

As shown particularly in Fig. 2, the front ends of the soil engaging blades 11 are inclined upwardly and forwardly as at 19 and it will also be seen, in said figure, that the front ends of the runners 1 are curved upwardly and forwardly so that the parts will thus ride easily over the soil engaged thereby. Brackets 20 are connected to the centers of the front ends of the body portions 9 of the cultivator and draft devices 21 are adapted to be connected to these brackets. Eyes 22 extend from the body portions 9 at the sides opposite those from which the eyes 8 extend.

It will be apparent that when the parts are arranged as shown in the drawings, the machine, when drawn along a furrow, with the runners 1 traveling within the furrow, will engage the soil and draw it into the furrow, the blades 11 performing this operation. At the same time any grass or weeds which may be growing at the sides of the furrow will be cut off by sharpened blades or knives 22' which extend laterally and rearwardly from the front end portions of the runners 1 and under the sections 9. These blades are adjustably and detachably connected to the runners preferably by means of U-bolts 23 extending through the runners and which straddle arms 24 formed integral with and extending rearwardly from the inner ends of the blades. During the operation of the machine the weight of the driver is transmitted, through beam 5 and arches 3, to the sections 9 and the blades 11 are thus caused to bite into the soil and not only shift it toward the furrow, when the parts are arranged as in Fig. 3, but also to pulverize and to pack the soil. The weight of the driver is furthermore transferred to the sections 9 by the braces 15.

Should it be desired to use the machine for shifting the soil away from the furrow, it is merely necessary to transpose the sections 9 so that the eyes 22 will be engaged by the rearwardly extending end portions 7 of the arches.

It is to be understood that if desired, the runners 1 can be dispensed with and the arches removed from engagement with the sections 9 after which said sections can be connected together by placing the eyes 8 of one section in alinement with the eyes 8 of the other section and then running a rod through the eyes which serves to pivotally connect them. A number of sections can thus be connected and the resultant structure used as a harrow or pulverizer.

What is claimed is:—

1. A cultivator including spaced soil engaging supporting means, a connection therebetween, and oppositely disposed sections hingedly connected to the respective supporting means, each section including a body portion and separate rows of parallel blades secured to the lower face of the body portion, the blades of all of the rows being parallel and one of said rows being arranged in front of the other row, all of the blades having substantially horizontal obliquely disposed soil engaging edges.

2. A cultivator including spaced soil engaging supporting means, a connection therebetween, and oppositely disposed sections hingedly connected to the respective supporting means each section including a body portion and separate rows of parallel blades secured to the lower face of the body portion, the blades of all of the rows being parallel and one of said rows being arranged in front of the other row, all of the blades having substantially horizontal obliquely disposed soil engaging edges, and means for adjusting the body portion angularly with respect to the soil engaging supporting means.

3. A cultivator including connected sections each including a body and a series of soil engaging blades upon the lower face of the body, said blades being obliquely disposed, the blades on one section converging toward the blades on the other section, and a soil engaging structure.

4. A cultivator including connected runners, means carried thereby for supporting a seat, sections hingedly connected to the respective runners and extending in opposite directions therefrom, each section including a body portion, and obliquely disposed soil engaging blades upon the lower surface of the body portion, all of said blades being parallel and having their active edges substantially horizontal, and means for adjusting the sections angularly upwardly and downwardly with relation to the runners.

5. A cultivator including a soil engaging seat supporting structure, interchangeable sections hingedly and detachably connected to the structure, each section including a body portion having an upturned front end, and a series of parallel blades extending downwardly from the body portion and having their front ends inclined upwardly and forwardly, the blades on each section being obliquely disposed and converging toward the blades on the opposed section.

6. A cultivator including a central soil engaging structure, interchangeable sections hingedly and detachably connected to the structure, each section including a body portion having an upturned front end, and a series of parallel blades extending downwardly from the body portion and having their front ends inclined upwardly and forwardly, the blades on each section being obliquely disposed and converging toward the blades on the opposed section, and draft devices connected to the front end portions of the sections.

In testimony that I claim the foregoing as my own, I have hereto affixed my signature in the presence of two witnesses.

WILLIAM P. MORROW.

Witnesses:
ERBEN SHILLHART,
ARTHUR ANDERSON.

---

Copies of this patent may be obtained for five cents each, by addressing the "Commissioner of Patents, Washington, D. C."